(12) United States Patent
Mamidela

(10) Patent No.: US 10,936,384 B1
(45) Date of Patent: Mar. 2, 2021

(54) PERFORMANCE TESTING OF ODATA APIS

(71) Applicant: SAP SE, Walldorf (DE)

(72) Inventor: Dilip Mamidela, Bangalore (IN)

(73) Assignee: SAP SE, Walldorf (DE)

( * ) Notice: Subject to any disclaimer, the term of this patent is extended or adjusted under 35 U.S.C. 154(b) by 0 days.

(21) Appl. No.: 16/661,477

(22) Filed: Oct. 23, 2019

(51) Int. Cl.
*G06F 9/54* (2006.01)
*G06F 9/451* (2018.01)

(52) U.S. Cl.
CPC .............. *G06F 9/543* (2013.01); *G06F 9/451* (2018.02)

(58) Field of Classification Search
None
See application file for complete search history.

(56) References Cited

U.S. PATENT DOCUMENTS

| | | | |
|---|---|---|---|
| 2007/0294673 A1* | 12/2007 | Guerrera | |
| 2013/0290932 A1* | 10/2013 | Kruglick | |
| 2014/0059381 A1* | 2/2014 | Lock | |
| 2016/0132552 A1* | 5/2016 | Xue | |
| 2016/0140184 A1* | 5/2016 | Deissner | |

* cited by examiner

*Primary Examiner* — Syed A Roni
(74) *Attorney, Agent, or Firm* — Buckley, Maschoff & Talwalkar LLC

(57) ABSTRACT

A method includes retrieving application programming interface (API) information including API calls from a plurality of APIs stored in a database, receiving, via a graphical user interface, a selection of one or more of the API calls retrieved from the database, receiving, via the graphical user interface, an input specifying a number of iterations to perform each of the selected one or more API calls, executing the selected one or more API calls on a target computer system for the specified number of iterations, retrieving performance information from the target computer system, and displaying the performance information on the graphical user interface.

20 Claims, 8 Drawing Sheets

| | Record No. | Release | App ID | App Type | Complexity | OData URL | ... | Step Name |
|---|---|---|---|---|---|---|---|---|
| 1 | 2 | 1902 | F1234 | Transactional | Simple | https://ccw-710.wdf.sap.corp:443/sap/opu/odata/sap/API_SALES_ORDER... | | Step2 |
| 2 | 4 | 1902 | F333 | Transactional | Simple | https://localhost | | Step3 |
| 3 | 5 | 1902 | F444 | Transactional | Simple | https://ccw-710.wdf.sap.corp:443/sap/opu/odata/sap/API_SALES_ORDER... | | Step2 |
| 2 | 3 | 1902 | F222 | Analytical | Complex | https://localhost | | Step7 |
| ... | | | | | | ... | | |

PERFORMANCE TESTING OF ODATA APIS

BACKGROUND

An application programming interface (API) hub provides user access to a central catalog (e.g., list) of APIs for application developers to search, discover, test, and consume the APIs to build extensions or integrations. For example, a user that logs into an API hub can discover and consume digital content packages with APIs, pre-packaged integrations, and sample applications. The APIs are heterogeneous in terms of protocols, documentation, and access mechanisms. A test environment is provided for testing of APIs.

In some instances, queries to the API are made by passing URLs via HTTP GET requests. In some embodiments, after a user logs into the API hub and selects an API of type OData (based on OData), the user can perform a GET request (e.g., a read operation). While a response may be provided, no details regarding performance are available. Furthermore, the operation cannot be iterated more than once.

It is cumbersome for a user to test every API manually by asynchronously executing the selected APIs and collating results. At present, no mechanism is available for end users to determine whether underlying OData operations of an API are performing optimally.

BRIEF DESCRIPTION OF THE DRAWINGS

Features and advantages of the example embodiments, and the manner in which the same are accomplished, will become more readily apparent with reference to the following detailed description taken in conjunction with the accompanying drawings.

FIG. 3 is a table showing a data structure according to some embodiments.

FIG. 7 is an illustration of a spreadsheet that displays results of the analysis according to some embodiments.

Figure 1:
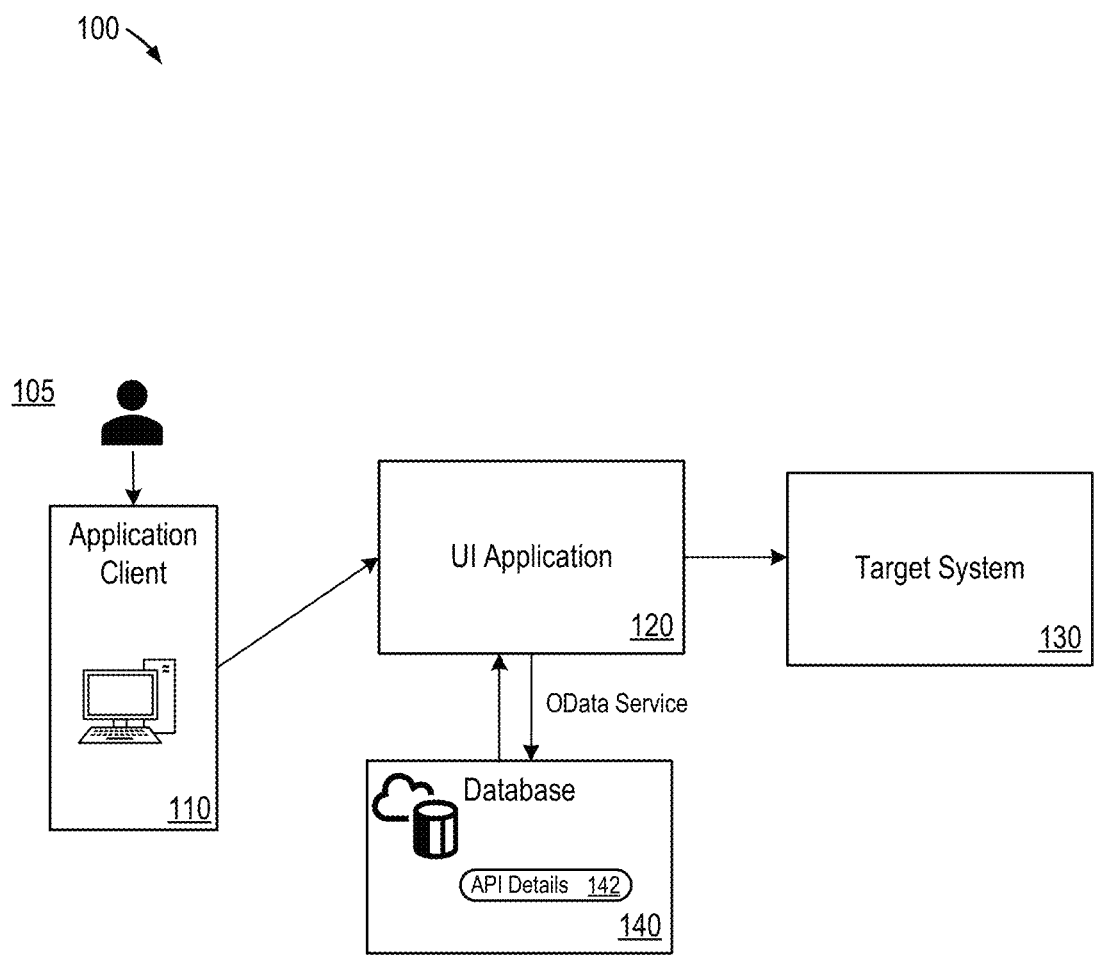
FIG. 1 is a block diagram of an architecture according to some embodiments.

Throughout the drawings and the detailed description, unless otherwise described, the same drawing reference numerals will be understood to refer to the same elements, features, and structures. The relative size and depiction of these elements may be exaggerated or adjusted for clarity, illustration, and/or convenience.

DETAILED DESCRIPTION

In the following description, specific details are set forth in order to provide a thorough understanding of the various example embodiments. It should be appreciated that various modifications to the embodiments will be readily apparent to those skilled in the art, and the generic principles defined herein may be applied to other embodiments and applications without departing from the spirit and scope of the disclosure. Moreover, in the following description, numerous details are set forth for the purpose of explanation. However, one of ordinary skill in the art should understand that embodiments may be practiced without the use of these specific details. In other instances, well-known structures and processes are not shown or described in order not to obscure the description with unnecessary detail. Thus, the present disclosure is not intended to be limited to the embodiments shown, but is to be accorded the widest scope consistent with the principles and features disclosed herein.

The disclosed embodiments relate to performance testing of application-programming interfaces (APIs), and more specifically, APIs that are based on OData ("OData APIs"). Among other things, the solution framework in the disclosed embodiments facilitates efficient evaluation or measurement of performance of OData APIs.

In some embodiments, end-to-end automation testing is provided which may be executed anytime, anywhere, without depending on an external tool. In some embodiments, this is achieved via an easy-to-use user interface (UI). Time consumption of debugging and optimization is greatly shortened and simplified.

The Open Data Protocol ("OData") is a REST-based web protocol for querying and updating data. It is built on technologies such as HTTP, Atom/XML, and JSON. It provides a uniform way to describe the data and the data model. It also defines a uniform way for creating, modifying, deleting, and accessing data. OData allows a user to query a data source using a Hypertext Transfer Protocol (HTTP) and receive a result in a useable format. OData can be used to expose and access data from several types of data sources like databases, file systems, and websites. Often in a web service scenario, there is a need to expose business objects in the form of OData so that the business object can be consumed as a web service.

In some examples, the embodiments herein may be incorporated within software that is deployed on a cloud platform.

The environments described herein are merely exemplary, and it is contemplated that the techniques described may be extended to other implementation contexts.

One or more embodiments that include one or more of the advantages discussed are described in detail below with reference to the figures.

FIG. 1 is a block diagram of an architecture 100 according to some embodiments. Architecture 100 includes application client 110, UI application 120, target system 130, and database system 140. Each of the illustrated components may be implemented by software and/or one or more hardware elements, with some software and/or hardware elements being shared among more than one illustrated component.

Client 110 may comprise one or more devices executing program code of a software application for presenting user interfaces (e.g., graphical user interface (GUI)) to allow interaction with UI application 120. Presentation of a user interface may comprise any degree or type of rendering, depending on the type of user interface code generated by UI application 120. For example, a client 110 may execute a Web Browser to request and receive a Web page (e.g., in HTML format) via HTTP or HTTPS, and may render and present the Web page according to known protocols. Target system 130 may comprise a test environment used to test the performance of an API.

Database system 140 implements an "in-memory" database, in which data 142 (e.g., details on APIs based on ODATA) represents a full database stored in volatile (e.g., non-disk-based) memory (e.g., Random Access Memory). The full database may be persisted in and/or backed up to fixed disks (not shown). Embodiments are not limited to an in-memory implementation. For example, data 142 may be stored in one or more fixed disks (e.g., persistent memory for storing their respective portions of the full database) and accessed during operation when needed.

Database system 140 may comprise any query-responsive data source or sources that are or become known, including but not limited to a structured-query language (SQL) relational database management system. Database system 140 may comprise a relational database, a multi-dimensional database, an eXtendable Markup Language (XML) document, or any other data storage system storing structured and/or unstructured data. Database system 140 may be distributed among several relational databases, dimensional databases, and/or other data sources. Embodiments are not limited to any number or types of data sources.

In some embodiments, data 142 may comprise one or more of conventional tabular data, row-based data, column-based data, and object-based data. Moreover, data 142 may be indexed and/or selectively replicated in an index to allow fast searching and retrieval thereof.

OData services expose an end point that allows UI application 120 to access data 142 in database 140. OData services implement the OData protocol and map data 142 between its underlying form (e.g., database tables, spreadsheet lists, etc.) and a format that the requesting client can understand.

OData defines an abstract data model and a protocol which, together, enable any client to access data exposed by any data source via a Uniform Resource Indicator (URI). The data model provides a generic way to organize and describe data. A GET request may list details and URIs of the resources in a collection and retrieve a specific item in the collection.

FIG. 1 represents a logical architecture for describing processes according to some embodiments, and actual implementations may include more or different components arranged in other manners. Other topologies may be used in conjunction with other embodiments. Moreover, each system described herein may be implemented by any number of devices in communication via any number of other public and/or private networks. Two or more of such computing devices may be located remote from one another and may communicate with one another via any known manner of network(s) and/or a dedicated connection. Each device may comprise any number of hardware and/or software elements suitable to provide the functions described herein as well as any other functions. For example, any computing device used in an implementation of system 100 may include a processor to execute program code such that the computing device operates as described herein.

Reference is now made to FIGS. 2-7, which will be discussed together.

Figure 2:
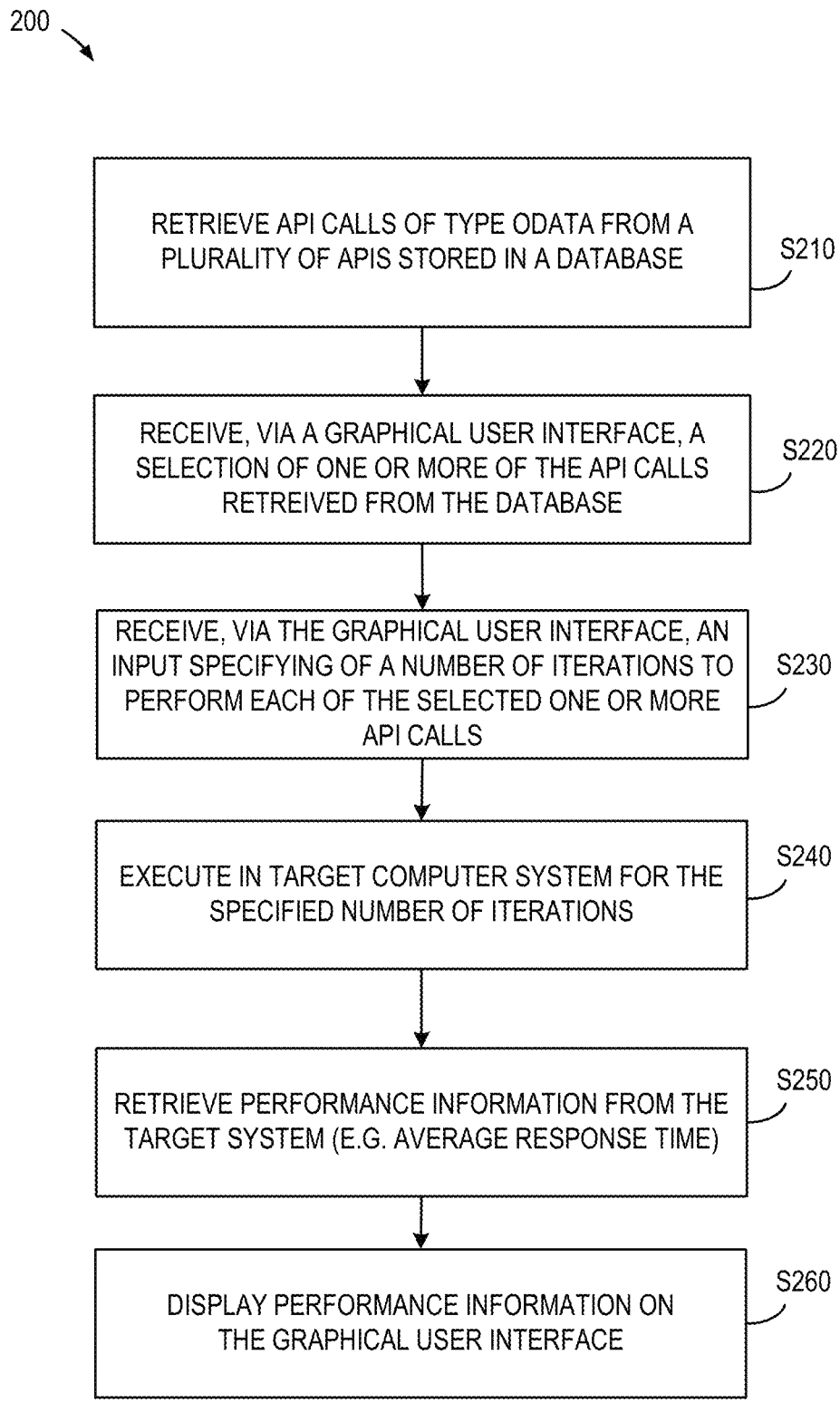
FIG. 2 is a flowchart illustrating an exemplary process according to some embodiments.

FIG. 2 is a flow diagram illustrating an exemplary process 200 according to some embodiments. More specifically, FIG. 2 is a flow diagram illustrating a process for testing the performance of OData APIs, according to some embodiments. In some embodiments, various hardware elements of an application platform execute program code to perform process 200.

Initially, at S210, API calls/entities based on OData are retrieved/extracted from a central catalog of APIs (e.g., an API Hub), and fetched, from a database. In some embodiments, one or more API calls are retrieved based on selection criteria specified using a graphical user interface (GUI). FIG. 3 illustrates an example of the fields and values of a data structure 300 stored in database 140.

Figure 4:
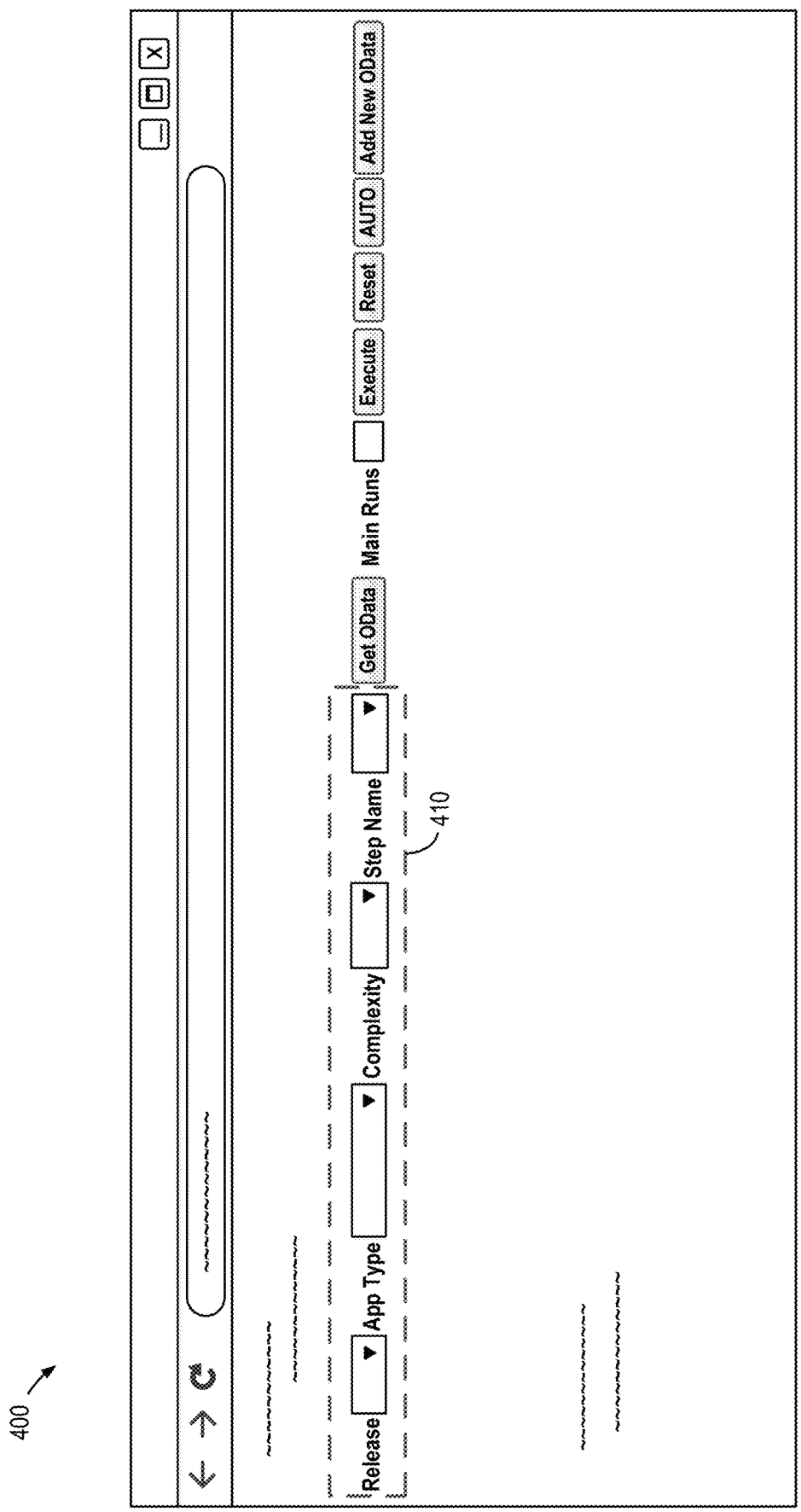
FIG. 4 is an outward view of user interface according to some embodiments.
Figure 5:
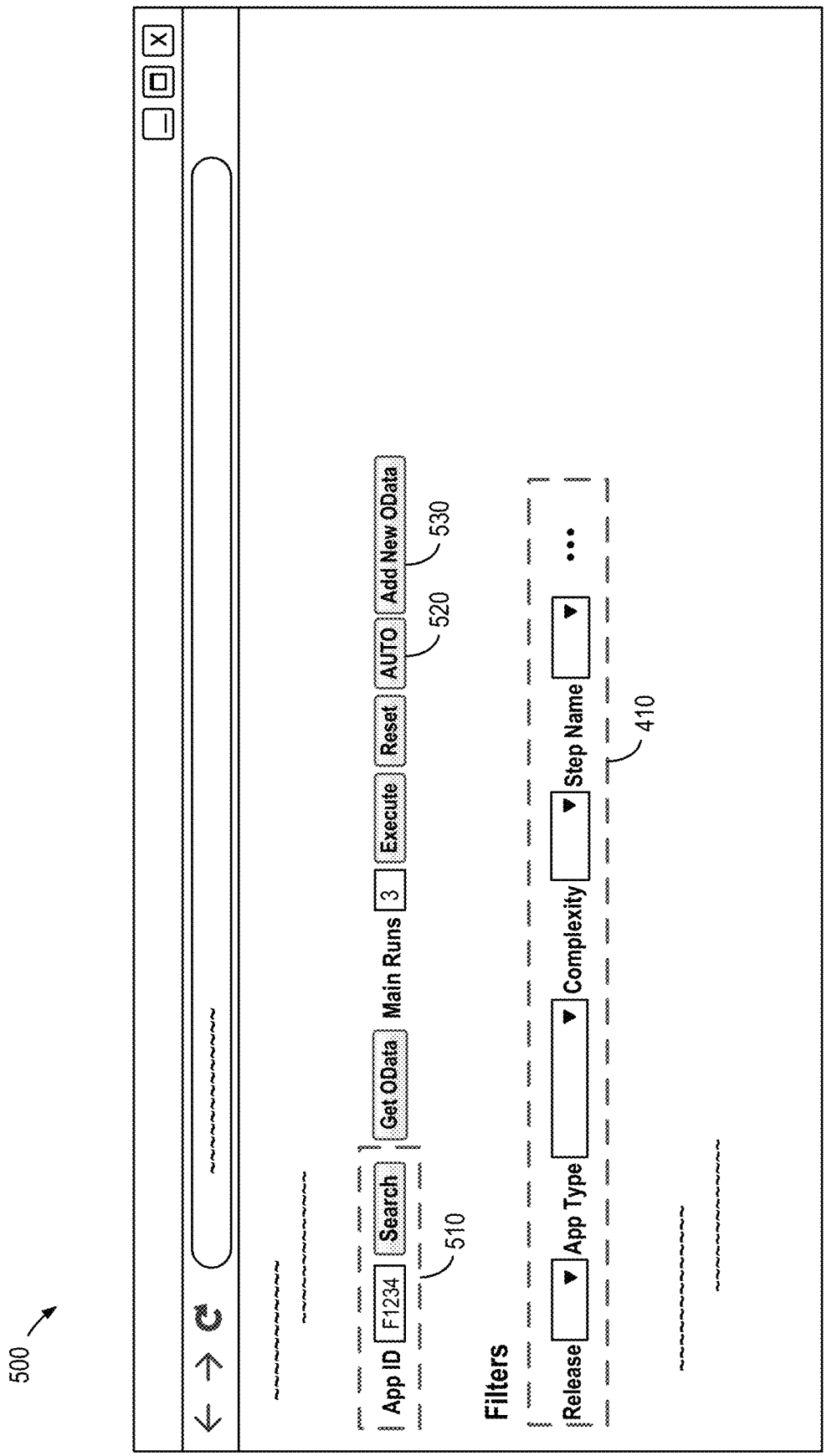
FIG. 5 is an outward view of user interface according to some embodiments.

As shown in FIG. 4, the selection criteria 410 on user interface 400 may include an application release number, application type, complexity, step name, and/or the like. Additionally or alternatively, as shown in FIG. 5, the selection criteria 510 on user interface 500 may include an application identifier (App ID) used on its own or in conjunction with filters 410 for extracting and downloading the API information from the catalog of APIs 142 stored in database 140. It should be appreciated that the selection criteria 410, 510 may be customizable by a user (e.g., through a preferences selection).

Additionally or alternatively, an (AUTO) button 520 is provided via which all the steps for a pre-selected custom criterion may be automatically executed. Additionally or alternatively, users are provided with the option to add new OData information to database 140 if desired (e.g., via a button 530). Additionally or alternatively, users are provided with the option to edit or update OData information stored in the database.

Next, at S220, via a graphical user interface, a selection of one or more API calls extracted from the database is received, and at S230, an input specifying a desired number of iterations (e.g., main runs) to perform each of the selected one or more API calls is provided.

In turn, at S240, performance testing for each of the selected one or more API calls is executed in a default target system for the specified number of iterations. Performance information, including an average response time of the iterations, is recorded and may be retrieved from the target system at S250. In some embodiments, the performance information is displayed on the graphical user interface at S260.

Figure 6:
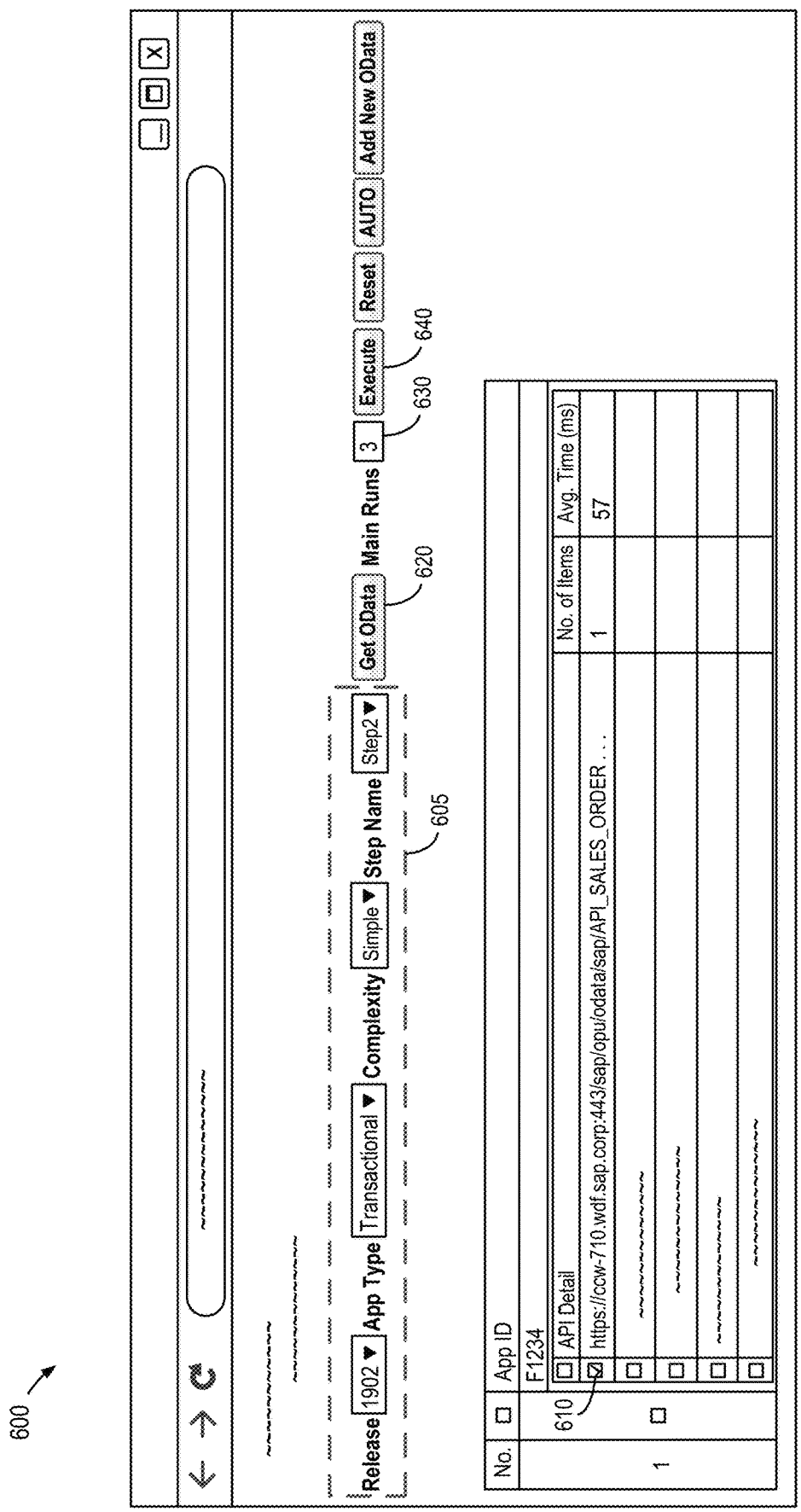
FIG. 6 is an outward view of user interface according to some embodiments.

By way of example, referring to FIG. 6, a user may provide desired filter criteria 605 on a graphical user interface 600 (e.g., by selecting from a drop-down menu, by typing in a parameter, or other form of input entry). Upon pressing an execute button 620 (e.g., "Get OData" button), processing is performed based on the selected filter criteria 600 and the user is presented with API calls that meet the selections.

After being presented with a list of API information (e.g., API calls), the user may select one or more of the API calls 610 and indicate a desired number of iterations 630 (e.g., main runs) to be performed on each of the selected one or more API calls. Upon pressing an execute button 640 (e.g., "Execute" button), performance testing for each of the selected one or more API calls is executed in a target system for the specified number of iterations.

In FIG. 6, for example, the number of main runs indicated is three. In some embodiments, in addition to the main runs, a default number of preliminary (e.g., buffered) runs, typically three, are implicitly handled without requiring user input. Once completed, a result set is displayed including an average response time of the iterations (e.g., in milliseconds).

In some embodiments, the average response time may include a processing time of a request (e.g., OData request), an end-to-end (E2E) response time, and an elapsed time.

Additionally, in some embodiments, prior to S240, the graphical user interface may include an option to specify the target system for triggering the execution.

Figure 7:
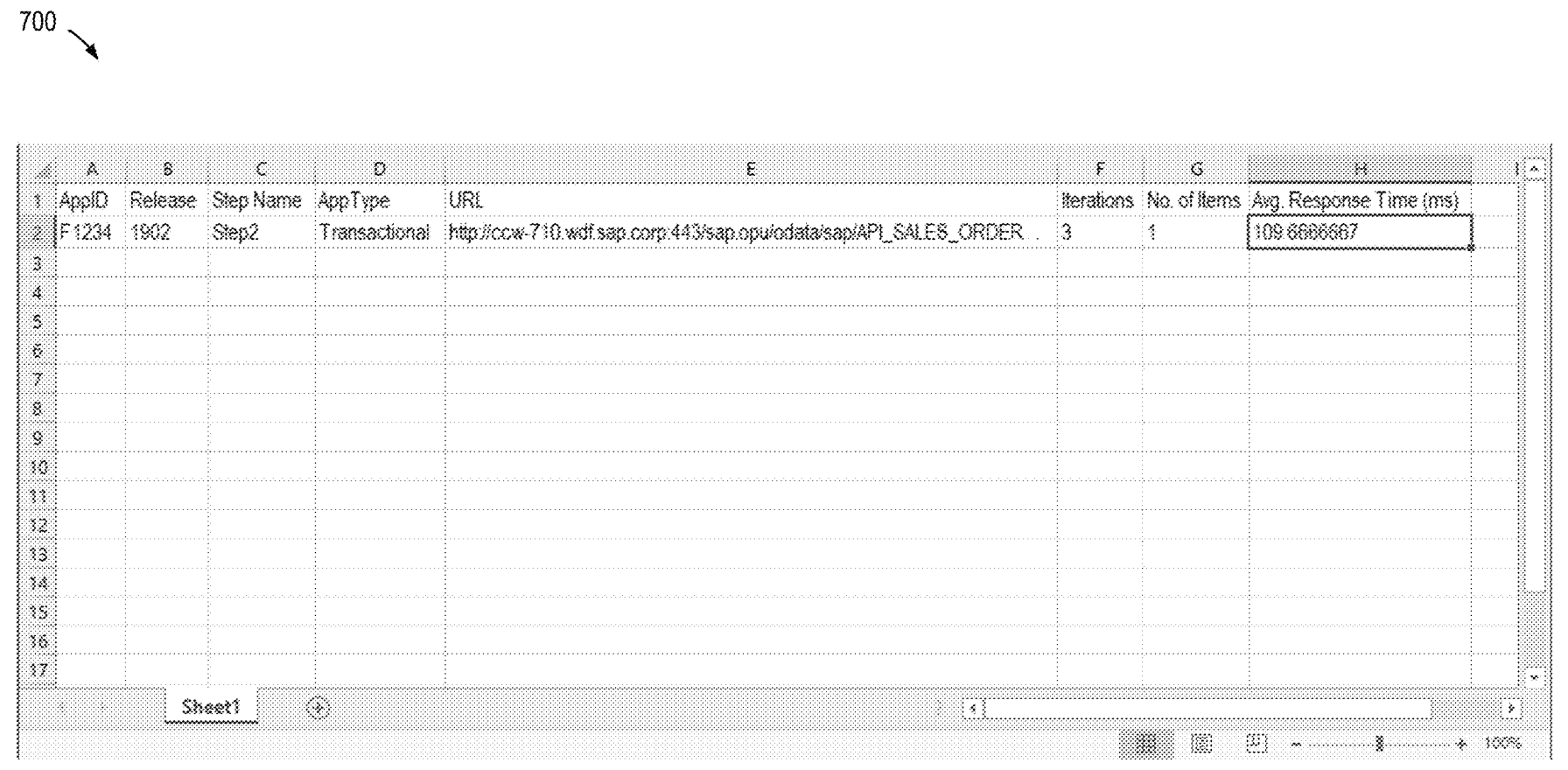

In some embodiments, the performance information, including the average response time of the iterations, is stored in a file 700 (e.g., spreadsheet) as shown in FIG. 7, that can be downloaded for future use (e.g., offline viewing).

As will be appreciated based on the foregoing specification, the above-described examples of the disclosure may be implemented using computer programming or engineering techniques including computer software, firmware, hardware or any combination or subset thereof. Any such resulting program, having computer-readable code, may be embodied or provided within one or more non-transitory computer-readable media, thereby making a computer program product, i.e., an article of manufacture, according to the discussed examples of the disclosure. For example, the non-transitory computer-readable media may be, but is not limited to, a fixed drive, diskette, optical disk, magnetic tape, flash memory, semiconductor memory such as read-only memory (ROM), and/or any transmitting/receiving medium such as the Internet, cloud storage, the internet of things, or other communication network or link. The article of manufacture containing the computer code may be made and/or used by executing the code directly from one medium, by copying the code from one medium to another medium, or by transmitting the code over a network.

The computer programs (also referred to as programs, software, software applications, "apps", or code) may include machine instructions for a programmable processor, and may be implemented in a high-level procedural and/or object-oriented programming language, and/or in assembly/machine language. As used herein, the terms "machine-readable medium" and "computer-readable medium" refer to any computer program product, apparatus, cloud storage, internet of things, and/or device (e.g., magnetic discs, optical disks, memory, programmable logic devices (PLDs)) used to provide machine instructions and/or data to a programmable processor, including a machine-readable medium that receives machine instructions as a machine-readable signal. The "machine-readable medium" and "computer-readable medium," however, do not include transitory signals. The term "machine-readable signal" refers to any signal that may be used to provide machine instructions and/or any other kind of data to a programmable processor.

The above descriptions and illustrations of processes herein should not be considered to imply a fixed order for performing the process steps. Rather, the process steps may be performed in any order that is practicable, including simultaneous performance of at least some steps. Although the disclosure has been described in connection with specific examples, it should be understood that various changes, substitutions, and alterations apparent to those skilled in the art can be made to the disclosed embodiments without departing from the spirit and scope of the disclosure as set forth in the appended claims.

Figure 8:
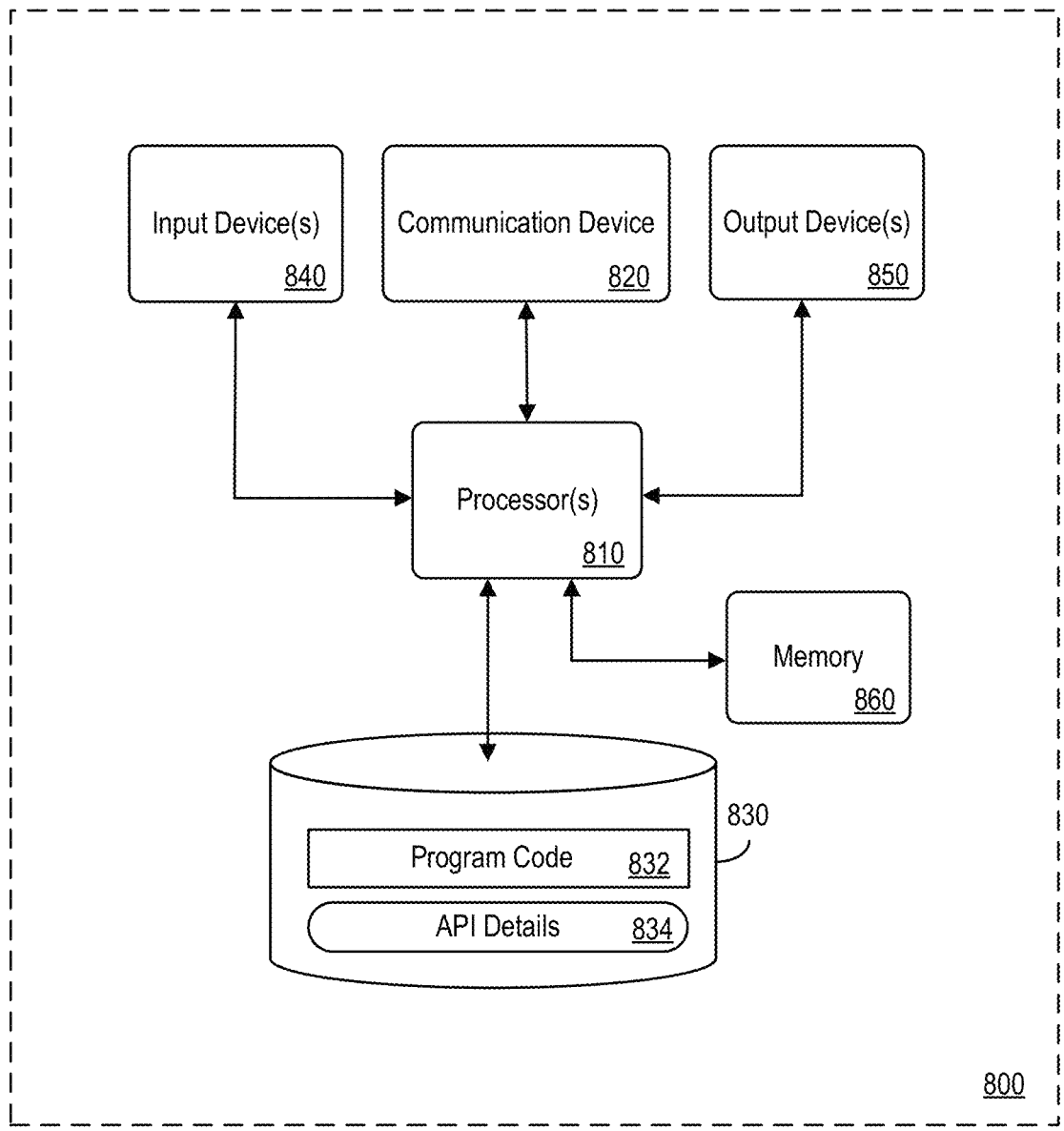
FIG. 8 is a block diagram of an apparatus according to some embodiments.

FIG. 8 is a block diagram of apparatus 800 according to some embodiments. Apparatus 800 may comprise a general- or special-purpose computing apparatus and may execute program code to perform any of the functions described herein. Apparatus 800 may comprise an implementation of one or more elements of system 100. Apparatus 800 may include other unshown elements according to some embodiments.

Apparatus 800 includes processor 810 operatively coupled to communication device 820, data storage device 830, one or more input devices 840, one or more output devices 850, and memory 860. Communication device 820 may facilitate communication with external devices, such as an external design tool. Input device(s) 840 may comprise, for example, a keyboard, a keypad, a mouse or other pointing device, a microphone, knob or a switch, an infra-red (IR) port, a docking station, and/or a touch screen. Input device(s) 840 may be used, for example, to manipulate graphical user interfaces and to input information into apparatus 800. Output device(s) 850 may comprise, for example, a display (e.g., a display screen), a speaker, and/or a printer.

Data storage device 830 may comprise any appropriate persistent storage device, including combinations of magnetic storage devices (e.g., magnetic tape, hard disk drives and flash memory), optical storage devices, Read Only Memory (ROM) devices, etc., while memory 860 may comprise Random Access Memory (RAM).

Program code 832 of data storage device 830 may be executable by processor 810 to provide functions described herein, including but not limited to process 200. Embodiments are not limited to execution of these functions by a single apparatus. API details 834 may include the fields and values of OData APIs as shown in FIG. 3. Data storage device 830 may also store data and other program code for providing additional functionality and/or which are necessary for operation thereof, such as device drivers, operating system files, etc.

The foregoing diagrams represent logical architectures for describing processes according to some embodiments, and actual implementations may include more or different components arranged in other manners. Other topologies may be used in conjunction with other embodiments. Moreover, each component or device described herein may be implemented by any number of devices in communication via any number of other public and/or private networks. Two or more of such computing devices may be located remote from one another and may communicate with one another via any known manner of network(s) and/or a dedicated connection. Each component or device may comprise any number of hardware and/or software elements suitable to provide the functions described herein as well as any other functions. For example, any computing device used in an implementation of a system according to some embodiments may include a processor to execute program code such that the computing device operates as described herein.

All systems and processes discussed herein may be embodied in program code stored on one or more non-transitory computer-readable media. Such media may include, for example, a floppy disk, a CD-ROM, a DVD-ROM, a Flash drive, magnetic tape, and solid state Random Access Memory (RAM) or Read Only Memory (ROM) storage units. Embodiments are therefore not limited to any specific combination of hardware and software.

Embodiments described herein are solely for the purpose of illustration. Those in the art will recognize other embodiments may be practiced with modifications and alterations to that described above.

What is claimed is:

1. A computer-implemented method comprising:
   retrieving application programming interface (API) information including API calls from a plurality of APIs stored in a database;
   receiving, via a graphical user interface, a selection of one or more of the API calls retrieved from the database;
   receiving, via the graphical user interface, an input specifying a number of iterations to to be performed on each of the selected one or more API calls;
   executing the selected one or more API calls on a target computer system for the specified number of iterations;
   retrieving performance information from the target computer system; and
   displaying the performance information on the graphical user interface.

2. The method of claim 1, wherein the API calls are retrieved based on a selection of filter criteria through input to a graphical user interface.

3. The method of claim 1, wherein the API calls are based on Open Data Protocol (OData).

4. The method of claim 1, wherein the database is an in-memory database.

5. The method of claim 1, wherein the target computer system is selected based on a user selection input to a graphical user interface.

6. The method of claim 1, wherein the performance information includes an average time taken to perform the specified number of iterations.

7. The method of claim 1, wherein the performance information is provided in a form of a downloadable file.

8. A system comprising:
a processor; and
a memory in communication with the processor, the memory storing program instructions, the processor operative with the program instructions to perform the operations of:
 retrieving application programming interface (API) information including API calls from a plurality of APIs stored in a database;
 receiving a selection of one or more of the API calls retrieved from the database;
 receiving an input specifying a number of iterations of runs to be performed on each of the selected one or more API calls;
 executing the selected one or more API calls on a target computer system for the specified number of iterations;
 retrieving performance results from the target computer system; and
 displaying the performance results on a user interface.

9. The system of claim 8, wherein the API calls are retrieved based on a selection of filter criteria through input to a graphical user interface.

10. The system of claim 8, wherein the API calls are based on Open Data Protocol (OData).

11. The system of claim 8, wherein the database is an in-memory database.

12. The system of claim 8, wherein the target computer system is selected based on a user selection input to a graphical user interface.

13. The system of claim 8, wherein the performance information results includes an average time taken to perform the specified number of iterations.

14. The system of claim 8, wherein the performance results is provided in a form of a downloadable file.

15. A non-transitory computer readable medium having stored therein instructions that when executed cause a computer to perform a method comprising:
 retrieving application programming interface (API) information including API calls from a plurality of APIs stored in a database;
 receiving, via a graphical user interface, a selection of one or more of the API calls retrieved from the database;
 receiving, via the graphical user interface, an input specifying a number of iterations to be performed on each of the selected one or more API calls;
 executing the selected one or more API calls on a target computer system for the specified number of iterations;
 retrieving performance information from the target computer system; and
 displaying the performance information on the graphical user interface.

16. The non-transitory computer-readable medium of claim 15, wherein the API calls are retrieved based on a selection of filter criteria through input to a graphical user interface.

17. The non-transitory computer-readable medium of claim 15, wherein the API calls are based on Open Data Protocol (OData).

18. The non-transitory computer-readable medium of claim 15, wherein the database is an in-memory database.

19. The non-transitory computer-readable medium of claim 15, wherein the target computer system is selected based on a user selection input to a graphical user interface.

20. The non-transitory computer-readable medium of claim 15, wherein the performance information includes an average time taken to perform the specified number of iterations.

* * * * *